United States Patent [19]

Einkauf et al.

[11] Patent Number: 5,163,126

[45] Date of Patent: Nov. 10, 1992

[54] METHOD FOR ADAPTIVELY PROVIDING NEAR PHONG GRADE SHADING FOR PATTERNS IN A GRAPHICS DISPLAY SYSTEM

[75] Inventors: Mark A. Einkauf, Leander; Michael M. Klock; Ngocha T. Le, both of Austin, all of Tex.

[73] Assignee: International Business Machines Corporation, Armonk, N.Y.

[21] Appl. No.: 521,632

[22] Filed: May 10, 1990

[51] Int. Cl.$^5$ .............................................. G06F 15/72
[52] U.S. Cl. ..................................... 395/123; 395/126
[58] Field of Search ................................. 395/123, 126

[56] References Cited

U.S. PATENT DOCUMENTS

| | | | |
|---|---|---|---|
| 4,646,251 | 2/1987 | Hayes et al. | 395/123 |
| 4,725,831 | 2/1988 | Coleman | 340/747 |
| 4,805,116 | 2/1989 | Liang et al. | 395/129 |
| 4,819,192 | 4/1987 | Kuragano et al. | 395/126 X |
| 5,031,117 | 7/1991 | Minor et al. | 395/126 X |

OTHER PUBLICATIONS

"Computer Graphics", D. Hearn and M. P. Baker, pp. 289-291, Prentice-Hall, 1986.
"Fundamentals of Interactive Computer Graphics", J. D. Foley and A. Van Dam, pp. 575-584, Addison-Wesley, 1982.

Primary Examiner—Gary V. Harkcom
Assistant Examiner—Mark K. Zimmerman
Attorney, Agent, or Firm—Casimer K. Salys; Paul S. Drake

[57] ABSTRACT

A method for producing realistic shading of three-dimensional objects depicted in a graphics display system. Computationally efficient Gouraud shading is practiced in the rendering of images which routinely require Phong shading to obtain suitable realism. Gouraud shading is adaptively applied to polygon regions of preferably triangular shape at a granularity defined by heuristically derived relationships using surface normal vectors, incident light vectors and relative pixel separation information. When division of the base triangle is dictated, the methodology produces a mesh of polygons sized to be individually rendered with Gouraud shading yet provide Phong-like realism for the whole of the original polygon region.

11 Claims, 4 Drawing Sheets

METHOD FOR ADAPTIVELY PROVIDING NEAR PHONG GRADE SHADING FOR PATTERNS IN A GRAPHICS DISPLAY SYSTEM

BACKGROUND OF THE INVENTION

The present invention relates in general to a method for determining the intensity and color parameters used to render shaded patterns on a video display. More particularly, the invention defines a method for selectively and adaptively modifying the shading procedure in relation to the surface gradient and the location of the light source, with the objective of providing picture realism typical of Phong shading without incurring the graphics system computational burden associated with pure Phong shading.

Static and dynamic three dimensional images are routinely generated by conventional workstation grade computers. The effects of light impinging on and reflected from the three dimensional surfaces being rendered requires that the color parameter calculations account for object surface contour and light source location characteristics. Fundamentally, the fewer the discontinuities in the rendered shading the greater the realism of the image being portrayed.

The ideal method of shading a simulated object subject to display involves the individualized calculation of intensity and hue for each pixel depicted on the screen. Unfortunately, workstation video display screens routinely have well in excess of one million pixels. The computational burden associated with such idealized methods of shading is very significant, resulting in slow real time image regeneration. The delays in rendering shaded patterns would obviously become quite pronounced and unacceptable for images of dynamic objects.

Intensity interpolation shading, generally referred to as Gouraud shading and normal vector interpolation shading, generally referred to as Phong shading, are described in the text books "Fundamentals of Interactive Computer Graphics" by Foley et al. an Addison-Wesley publication of copyright 1982. and "Computer Graphics" by Hearn et al. a Prentice-Hall publication of copyright 1986. Refinements in the interpolation of intensity magnitudes are described in U.S. Pat. No. 4,805,116. A refined use of a raster scan display to render polygon objects is described in U.S. Pat. No. 4,725,831.

In general Gouraud shading involves the calculation of intensity values at the vertices of defined polygons followed by linear interpolations of intensity for the remaining surface of the polygon from such vertex values. Though computationally efficient, the Gouraud method of shading ignores the non-linear relationships between the incident light vectors, the surface normal vectors and the intensity of the reflected-light.

The Phong shading method linearly interpolates the surface normal vectors between polygon vertices, rather than the intensity itself. Thereafter, such interpolated vectors are used to calculate the intensity at each pixel position within the polygon to account for incident light location and surface normal orientation effects on the derived intensity for each pixel. The computational burden of such custom rendering by pixel is significant.

Experience with the shaded rendering of numerous images has confirmed that Gouraud shading is quite adequate and realistic for image surfaces having certain types of illumination and surface normal characteristics, yet woefully inadequate for adjacent image areas with somewhat different sets of such characteristics. Consequently, if Gouraud shading is implemented to ease the computational burden, image realism degrades significantly for some, but not all, objects. On the other hand, if Phong shading is utilized for rendering, hardware cost, generation speed and image dynamic capability suffer. Therefore, there existed a need for a method of shading which exhibits the computational characteristics of Gouraud shading while providing the realism of Phong shading, and which can be implemented selectively and adaptively based upon the idiosyncrasies of the object subject to shading.

SUMMARY OF THE INVENTION

The method according to the present invention provides shading approaching the realism of Phong in the context of a Gouraud computational procedure by selectively and adaptively adjusting the size of the polygons in relation to the incident light vectors and the surface normal vectors. The invention provides a heuristically derived and selectively practiced procedure for partitioning a polygon surface area adequately to obtain shading realism while avoiding the comprehensive per pixel intensity computation of pure Phong shading.

According to a preferred practice of the invention, the surface normal vectors at the polygon vertices are first related to the incident light vectors and then compared as to relative location. The results are evaluated to derive a heuristical measure of the division needed for realistic rendering. The invention then practices a systematic partitioning of the polygon in keeping with the heuristically defined division for individualized Gouraud shading.

A particularized implementation of the invention involves the use of triangular polygon regions. According to such practice, the incident light and surface normal vector dot products at the triangle corners are calculated and compared. If found to exhibit values above established thresholds, the related edges are heuristically divided. The granularity of the divided triangles is consistent with that required to render objects in near Phong grade realism. The triangles in the mesh defined by such division are individually rendered by Gouraud shading.

These and other features of the present process will be more clearly understood and fully appreciated upon considering the detailed description set forth hereinafter.

DESCRIPTION OF THE PREFERRED EMBODIMENT

Figure 1:
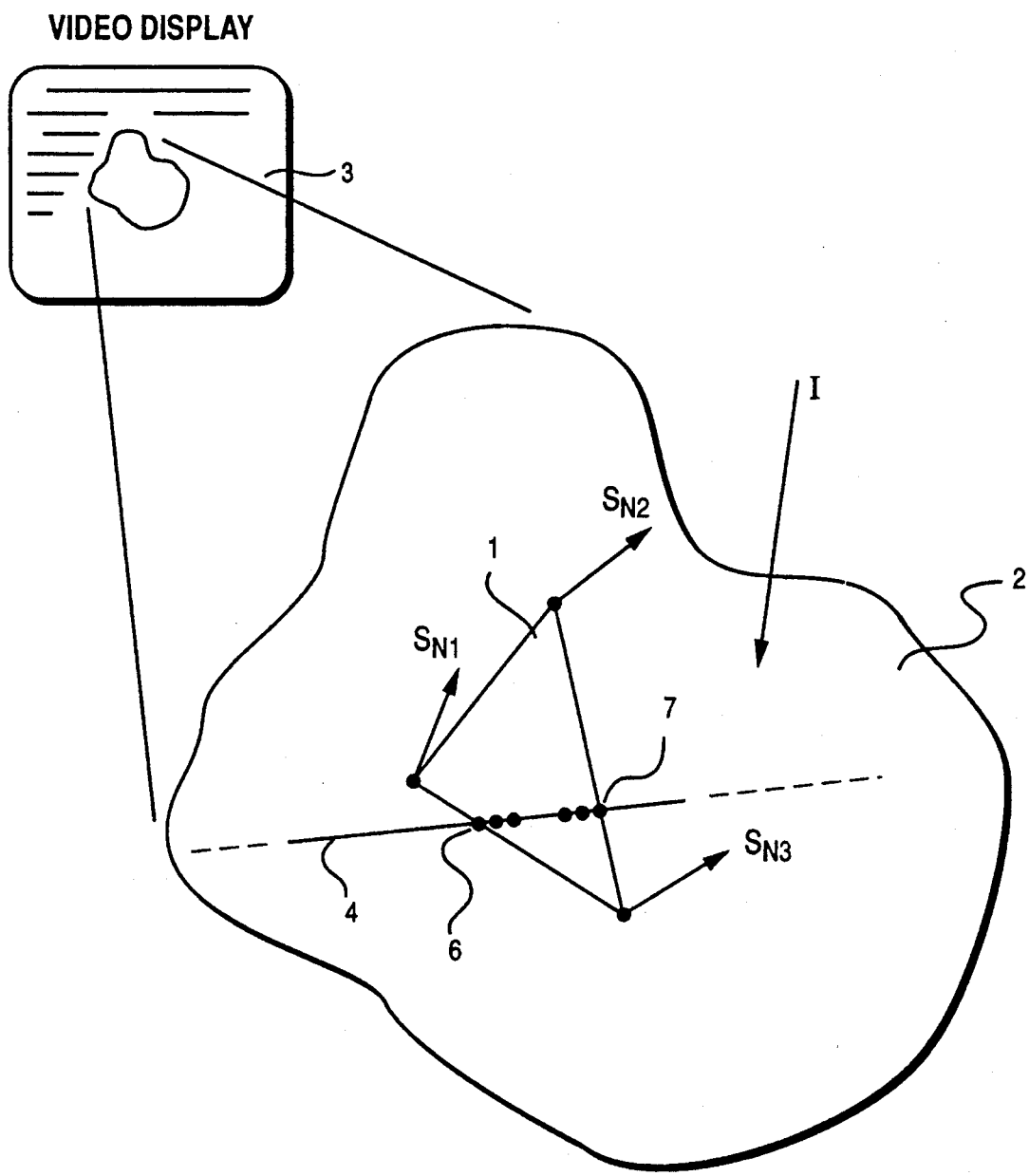
FIG. 1 is a schematic depiction of a region within an image on a video display.

The present invention as preferably practiced uses heuristic information to adaptively reconfigure polygon regions which would conventionally require Phong shading for realism to regions of a size and shape suitable for rendering with Gouraud shading hardware.

For many surface and lighting situations three dimensional objects rendered by unrefined Gouraud shading suffer from numerous visually detracting deficiencies, the prevailing examples being an absence of specular highlights and the presence of mach banding. Consequently, the developers of a 3-D video graphics systems with shading are placed in the dilemma of providing hardware which performs pure Gouraud shading at a suitable rate but with inherent deficiencies as to realism, or providing significantly more complex hardware to perform pure Phong shading but at a materially slower pattern rendering rate, or possibly providing both forms of hardware, at a significantly greater system cost, with selective use depending on the demands of the application. Implementation of the two shading techniques through software is not practical given that such rendering is multiple orders of magnitude slower.

The present invention avoids the duplication of shading hardware while providing the requisite degree of realism by utilizing an implementation of Gouraud shading which is adaptively compensated in the direction of Phong shading. In such selectively implemented practice, the classic deficiencies of Gouraud shading are eliminated without the hardware cost, computational complexity, and speed deficiencies characterizing pure Phong shading.

The three objectives of realism, speed and hardware simplicity were satisfied upon appreciating that Gouraud shading could be practiced at heuristically defined finer levels of granularity without reaching the ultimate level of pure Phong shading. In the context of such an approach, the method involves the practice of conventional Gouraud shading when the surface subject to shading would not benefit meaningfully from a refinement, yet provides an adaptive division and rendering of the polygon region to attain near Phong grade shading when the lighting conditions and surface contours so require.

The present method is derived from an appreciation of the relationships which affect rendering realism, being based upon the general premise that a typical graphics image requires Phong grade shading only in regions where the surface normals and incident light vectors are changing rapidly. Thus, the slow rendering speed and hardware costs of pure Phong shading provide no material returns in regions where the surface normals and incident light vectors are relatively stable. The presently implemented adaptive method differentiates and adjusts the shading operation depending the rates of change of the surface normals and incident light vectors by combining the fundamental Gouraud shading method with heuristically defined decision and partitioning operations to practice refined Gouraud shading.

The shading method of the present invention shall be described in the context of providing adaptive shading for a polygon shaped region as might appear on a graphics video display. In particular, the method will involve the analysis and refinement of a triangle shaped 3-D polygon region subject to rendering on high resolution raster scan color video display. However, the method is not limited to that application, in that it may be practiced in the context of other display technologies as well as those technologies which create hard copies of the images subject to shaded rendering.

FIG. 1 schematically illustrates a triangular region 1 defined to be a part of 3-D object 2 and subject to shaded rendering on video display 3. Object 2 is illuminated by collimated incident light vector I. Analysis with multiple non-collimated light sources merely increases the number of calculation and evaluation operations. Object 2 is considered to be 3-dimensional and non-planar, with surface normals $S_{N1}$, $S_{N2}$, and $S_{N3}$ at the three vertices of triangular region 1. A scan line 4 of the video display 3 is shown crossing triangle 1.

The practice of pure Phong shading would first entail an interpolation of the surface normal vectors so as to define a vector for each pixel position between pixels 6 and 7, 6 and 7 being located on the perimeters of triangle 1. The calculation of the reflected light at each such pixel position would then be accomplished using each interpolated surface normal vector and the incident light vectors impinging each of such pixel positions. The calculations would be repeated for each and every pixel within triangular region 1.

Shading of triangle 1 according to the Gouraud convention, on the other hand, would involve three calculations of reflected light, one at each of the triangle vertices. Thereafter, the reflected light intensities at positions such as triangle boundary pixels 6 and 7 would be determined from an interpolation of the vertex values. The intensity characteristics of the pixels along scan line 4, between triangle boundary pixels 6 and 7, would involve further linear interpolations using the values previously derived for perimeter pixels 6 and 7. Since interpolations are significantly easier and faster to compute than the reflected light characteristics for each pixel, Gouraud shading is the norm for rendering 3-D objects in graphics display systems.

The present invention provides near Phong grade shading, yet is implemented with the method and hardware of Gouraud shading. It involves an analysis of the polygon, a triangle, and the light characteristics followed by a heuristically derived adaptive division of the triangle into a mesh of triangles whose granularity is suitable for individualized Gouraud shading.

Figure 4:
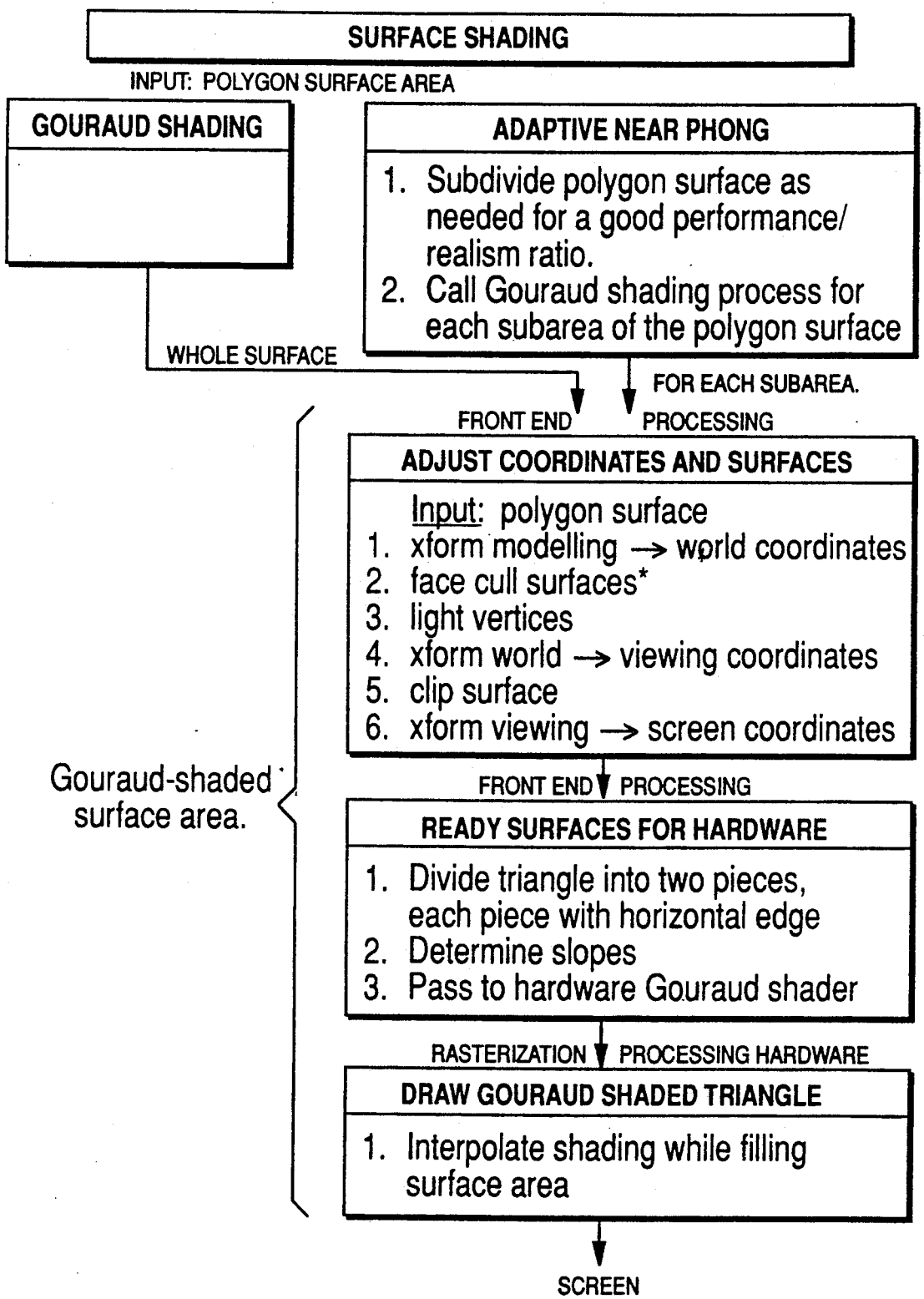
FIG. 4 is a schematic of functional blocks by which surface shading can be accomplished.
Figure 5:
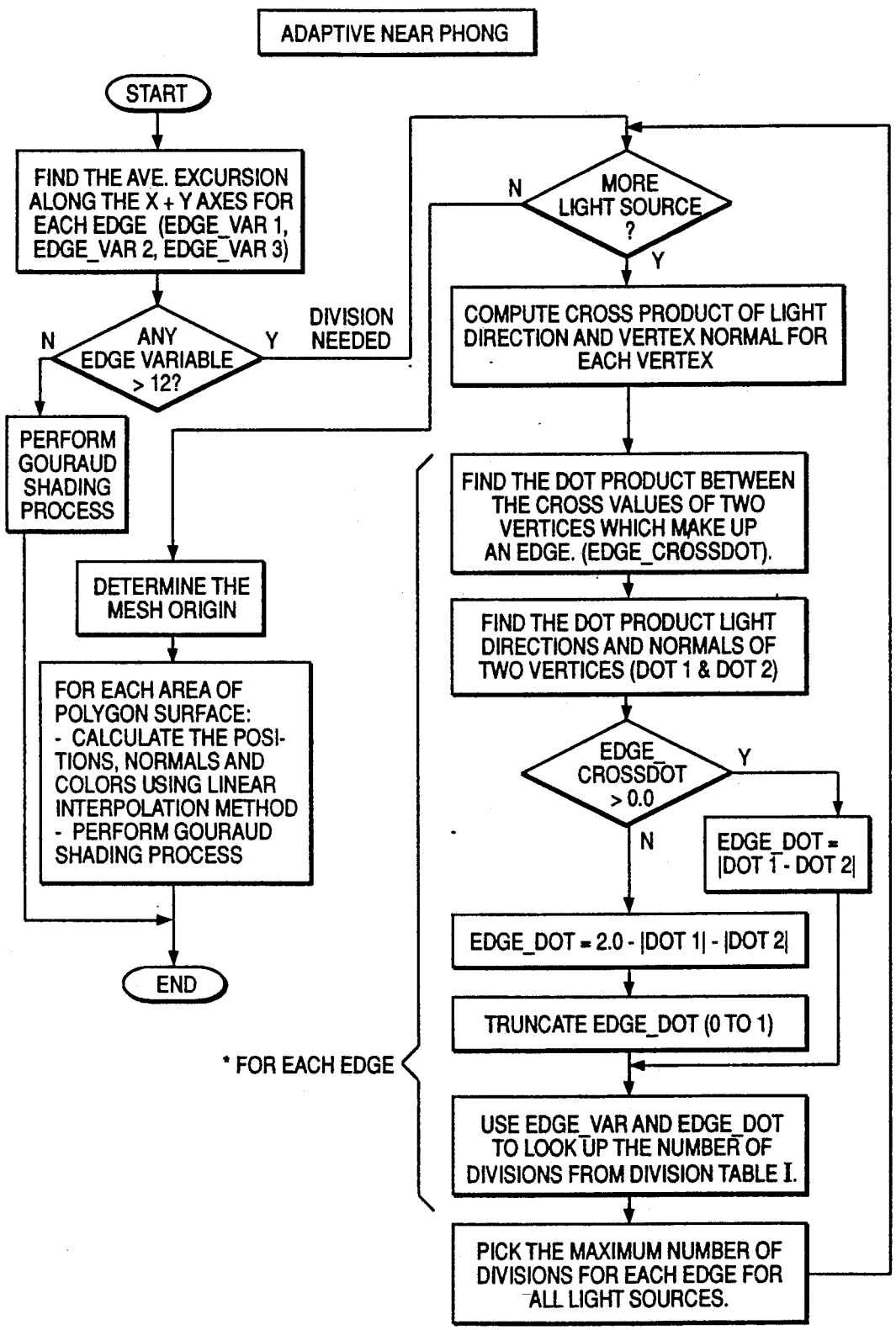
FIG. 5 is a schematic having a flow diagram for practicing adaptive near Phong shading.

The preferred practice of the present invention will be described in the context of triangular region 8, depicted in FIGS. 2 and 3 at different stages of triangle mesh generation. FIG. 4 depicts by functional block diagram the operations associated with surface shading, also showing the relation of practicing adaptive near Phong shading to that of Gouraud shading alone. FIG. 5 presents a flow diagram of the adaptive near Phong shading method to which the invention pertains.

As a first step, the present method involves a determination of whether triangle 8 with vertices A, B, C would benefit meaningfully from Phong shading. If not, the triangle can be rendered directly using the Gouraud method with Gouraud shading hardware. In the context of a high resolution color graphics video display application, the first step heuristics of the present process leads one to compute the average of the X axis and Y axis pixel excursions for each edge of the triangle (($X_{excursion} + Y_{excursion}$)/2 by edge). Each average excursion is identified as an edge variable. If any one of the three edge variables is greater than 12, the method initiates division of the triangle into a mesh of triangles.

Upon concluding that division may be necessary, the preferred process involves a calculation of cross products of values relating to each vertex A, B and C of the triangle. Each cross product involves the surface normal vector at the vertex and a vertex related incident light vector, for each individual light source. The dot products of the cross products for pairs of vertices are computed in the next incremental step. The three dot products, identified as edge_crossdot in FIG. 5, are related to edges, the edges which join the respective triangle vertices. If a dot product is negative in value, the light source is situated between the vertices of the related edge. A positive value, on the other hand, denotes that the light source lies to one side of both vertices, with reference to the edge joining such vertices.

Next, a dot product of the two surface normal vectors and related incident light vectors is calculated for the specified vertices which make up each edge. The values so derived are identified as edge_dot in FIG. 5. If the light source was found to lie between the vertices the angular orientations as represented by the dot products are summed to establish the relative disparity of surface normal and light vector interactions at the two vertices. This evaluation is represented in FIG. 5 by the subtraction of both dot products from the constant value of 2.0. For a light source situated to one side of both vertices the relative effect is based upon the difference of the angular orientations, as represented by the difference in dot products. The concluding values by triangle edge are positively valued or truncated as necessary before use with Table I as the edge dot values.

Examples of edge dot values and surface normal/lighting interactions illustrate the information conveyed by such numerical values. As a first example, take the situation where the vertex normal vectors are relatively aligned and the light source is situated at a significant distance from the triangular region being illuminated. For such a situation, the edge dot values for the three edges are approximately identical and of a magnitude near zero. Therefore, Gouraud shading can be applied directly to the triangular region, given that finer granularity would provide negligible improvement in shading realism.

A different situation exists when the vertex normal vectors vary significantly, even though the light source remains located at a distance from the triangular region being illuminated. In this situation the dot products and related edge dot values differ significantly because the surface normal vectors are not consistent from vertex to vertex. The three edge dot values will be materially greater than zero but not fully approaching 1.0. Therefore the heuristic rules mandate that the base triangle be divided somewhat to ensure shading realism.

A third combination of vertex normal and incident light vectors is represented by the situation where the vertex normal vectors are relatively consistent but the light source is relatively close to the triangular surface. With the incident light vector differing at each of the vertex locations, the dot products and related edge dot values again differ materially. The three edge dot values are therefore materially greater than zero but not fully approaching 1.0. The base triangle should again be divided for shading realism, here as a consequence of the light position rather than any surface normal vector diversity.

As a final example of the interaction between the surface normal vectors and the incident light vectors, consider the situation where the vertex normal vectors differ significantly and the light source is fairly close to the triangular region on the illuminated object. In this case, one immediately recognizes that the edge dot values will be approaching 1.0 and as such mandate an accentuated level of division for realistic shading.

Heuristic evaluations have established that Phong-like realism can be attained when the degree of division defined in Table I is combined with Gouraud shading for each triangular region in the mesh. The inputs to Table I are the edge dot values for selected pairs of base triangle vertices and the corresponding maximum of the X or Y direction excursions between such pair of vertices by pixel. The table output represents the heuristically defined number of division segments for the base triangle edge lying between the selected vertices.

Figure 2:
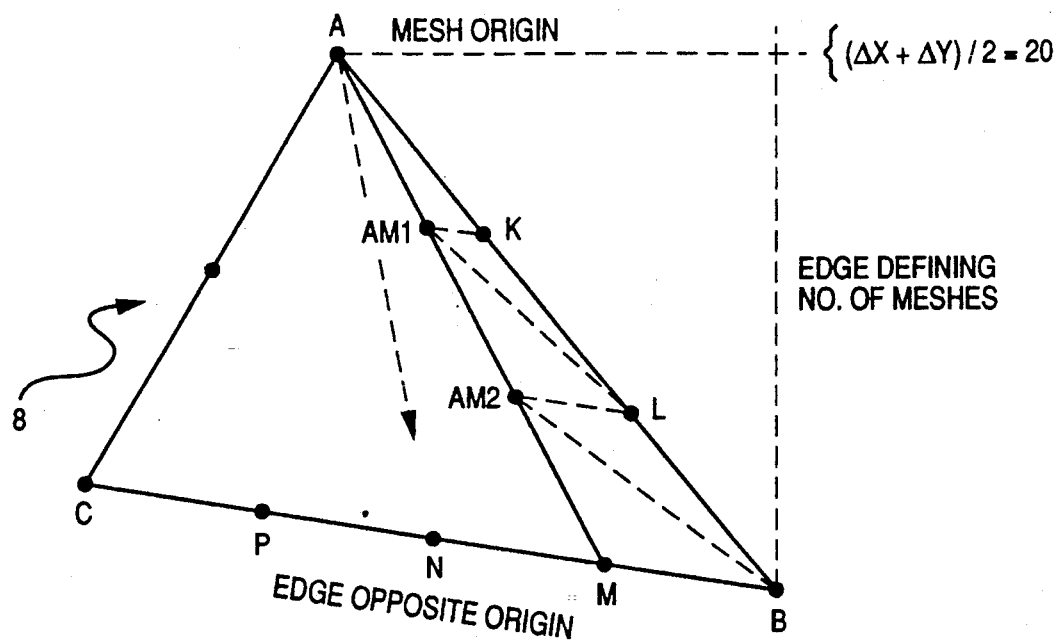
FIG. 2 is a schematic depiction of a triangular region subject to division according to one aspect of the present method, at an intermediate stage.

Using the base triangle in FIG. 2 as an example, if the edge dot value of the A and B vertices is 0.70 and $(\Delta X + \Delta Y)/2 = 20$, Table I establishes that the triangle edge defined by the line between A and B should be divided into three segments, such as with pixels K and L.

TABLE I

| Edge Dot | Average Excursion $((\Delta X + \Delta Y)/2)$ Edge Variable | | | | | | |
|---|---|---|---|---|---|---|---|
| | 10 | 15 | 20 | 25 | 30 | 35 | 40 | >45 |
| .60< | 1 | 2 | 2 | 3 | 3 | 4 | 4 | 5 |
| .65 | 2 | 2 | 3 | 3 | 4 | 4 | 5 | 5 |
| .70 | 2 | 3 | 3 | 4 | 4 | 5 | 5 | 6 |
| .75 | 3 | 3 | 4 | 4 | 5 | 5 | 6 | 6 |
| .80 | 3 | 4 | 4 | 5 | 5 | 6 | 6 | 7 |
| .85 | 4 | 4 | 5 | 5 | 6 | 6 | 7 | 7 |
| .90 | 4 | 5 | 5 | 6 | 6 | 7 | 7 | 8 |
| .95 | 5 | 5 | 6 | 6 | 7 | 7 | 8 | 8 |

Use closest fit edge dot value

The operations which culminated with the use of Table I provide heuristically derived quantitative information suitable to divide the base triangle and provide Phong-like realism by using Gouraud shading practices and hardware. One now only needs to divide the base triangle interior according to a methodology which comports with the edge division requirements to create a mesh of individual triangles suitable for individualized Gouraud shading. These objectives are satisfied by judiciously applying the division information acquired from Table I.

As a first step in dividing the base triangle into a mesh of triangles, the Table I division numbers are compared to determine the edge having the greatest division requirement. In the case of a tie, a random selection is performed. The vertex opposite the edge having the greatest division count is identified as the mesh origin. In the example base triangle of FIG. 2, presume that Table I has defined that base triangle edge AB must be divided into three segments, base triangle edge BC must be divided into four segments, and base triangle edge CA must be divided into two segments. This establishes that the mesh origin coincides with vertex A and has BC as the edge opposite the origin.

As a next step, the number of divisions for the two edges projecting from the mesh origin are compared in magnitude. The greater of the two is identified as the edge defining the number of meshes. In the event of a tie, one is selected at random. For the illustrative base triangle in FIG. 2, edge AB is the edge defining the number of meshes.

The division information for the two edges AB and BC is then used to generate the mesh internal to the base triangle 8. First, the edge opposite the origin is divided according to the count obtained from Table I to define the locations of pixels M, N and P. A simple table driven algorithm for accomplishing this division of a triangle edge involves the use of the relationship:

$$x = x0 + t(x1 - x0)$$

where $0 \leq t \leq 1$.

The values for t are read from a table which is easily generated for each numerical count of the divisions. For example for eight divisions t=0.125, 0.25, 0.375, 0.5, 0.625, 0.75, 0.875 and 1. As illustrated in FIG. 2, such divided pixel locations M, N and P thereafter establish the end points for the mesh lines radiating from mesh origin A. such as the dashed line AM and the dashed line emanating from mesh origin pixel A to edge situated pixel N.

With the lines emanating from mesh origin A established, the algorithm noted earlier is applied to define the locations of pixels K and L along base triangle edge AB. A similar operation is then performed along line AM, so as to define division pixels at locations AM1 and AM2. Thereafter, triangle mesh lines are defined between pixels AM1 and K, pixels AM1 and L, pixels AM2 and L, and pixels AM2 and B. The procedure is then repeated for the line defined between mesh origin pixel A and pixel N, for the line defined between pixels A and P, and finally for the edge CA. In each case, the lines projecting from mesh origin A are divided by the number value established for edge AB, which for the illustration in FIG. 2 requires that each line, and the concluding edge CA, be divided into three segments. The final shape of the mesh is depicted in FIG. 3.

Other triangle mesh generating techniques may be used as long as the number of divisions defined for each edge of the base triangle is no less than that prescribed by Table I. In the event a different mesh generating technique is practiced, care should be exercised to ensure that the mesh is not backfacing.

Figure 3:
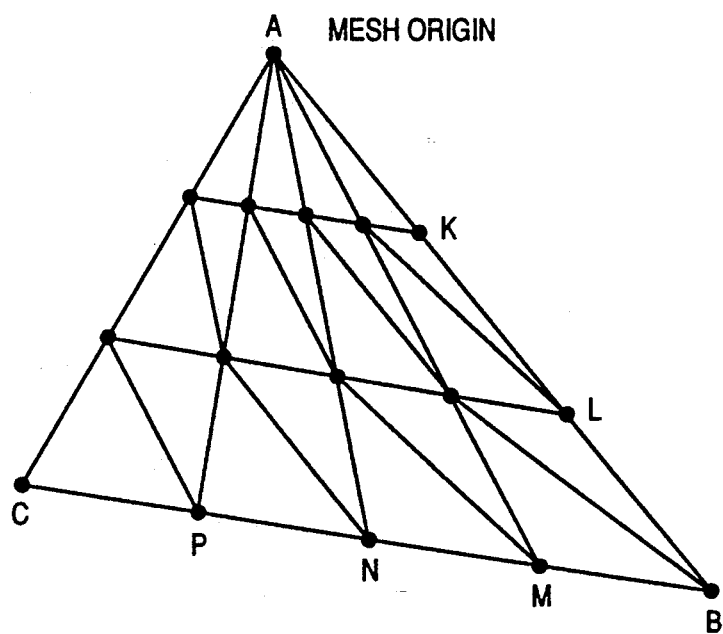
FIG. 3 is a schematic depiction of the triangular region in FIG. 2 following division into a triangular mesh suitable for Gouraud method shading.

Preferably, the triangles in the mesh of FIG. 3 are as a concluding step further subdivided by two, if necessary to have one horizontally disposed edge. The triangles are then individually rendered by Gouraud shading hardware, which shading now utilizes vector normal information of significantly greater granularity, but not to the ultimate level of pure Phong shading. The images so rendered exhibit realism approaching that of Phong shading yet at a computational and hardware cost more closely approaching the practice of conventional Gouraud shading.

The adaptive shading method of the present invention is particularly beneficial in that it can be implemented with the lower complexity rendering graphics hardware used for Gouraud shading, is selectively applied to base triangles only when division of base triangle is necessary to attain further shading realism, is further selective in that the base triangle is divided only to the extent reasonably necessary to attain realistic shading as defined by the interaction of the surface normal vectors and incident light vectors, utilizes a structured methodology for dividing the base triangle, and produces concluding shapes which are amenable to the triangle pattern Gouraud shading hardware.

Though the invention has been described and illustrated by way of specific embodiment, the method of the invention should be understood to encompass the full scope of practices defined by the claims set forth hereinafter.

We claim:

1. An adaptive method for shading patterns in a graphics rendering system, comprising the steps of:
   selecting a polygon within a graphic pattern to be shaded, said selected polygon having a plurality of vertices, each vertex having vector characteristics;
   comparing the vector characteristics of the vertices;
   dividing the selected polygon into further polygons, thereby defining at least one new vertex, when the selected polygon vector characteristics differ materially from each other;
   computing vector characteristics of the at least one new vertex; and
   using interpolation to shade the polygons.

2. The method recited in claim 1, wherein the selected polygon is a triangle.

3. The method recited in claim 2, wherein the vector characteristics for each vertex includes a selected surface normal vector and an incident light vector.

4. The method recited in claim 3, wherein the interpolation includes Gouraud shading the polygons.

5. The method recited in claim 1, wherein the vector characteristics relate to selected surface normal vectors and incident light vectors at the polygon vertices.

6. The method recited in claim 5, wherein the interpolation includes Gouraud shading the polygons.

7. A method for using interpolation to shade a graphic pattern including three-dimensional objects in a graphic display system, comprising the steps of:
   selecting a polygon within the graphic pattern to be shaded, said selected polygon having multiple vertices, each vertex having vector characteristics;
   comparing the vector characteristics of the vertices including related surface normal vectors and incident light vectors;
   dividing the selected polygon, thereby defining at least one new vertex, when the vector characteristics differ materially from each other;
   computing vector characteristics of the at least one new vertex; and
   using Gouraud shading to determine lighting for the polygons.

8. The method recited in claim 7, wherein the polygon is a triangle.

9. The method recited in claim 8, wherein the step of dividing includes partitioning the selected triangle into two or more triangles.

10. A method for using interpolation to shade three-dimensional objects in a graphic display system, comprising the steps of:
   a) selecting a triangle within the graphic pattern to be shaded, said selected triangle having multiple vertices, each vertex having vector characteristics;
   b) comparing the vector characteristics of the vertices using related surface normal vectors and incident light vectors, said comparing including the steps of:
      i) calculating cross products of selected surface normal vectors and a related incident light vector;
      ii) calculating a dot product of two cross products to determine an orientation of the related incident light vector;
      iii) calculating first and second dot products of the selected surface normal vectors and the related incident light vector;

iv) relating the first and second dot products and the orientation of the incident light vector to a distance between the selected surface normal vectors; and c) dividing the selected triangle into two or more triangles, thereby defining at least one new vertex, when the vector characteristics differ materially from each other and the distance between the surface normal vectors is large;

d) computing vector characteristics of the at least one new vertex; and e) using Gouraud shading to determine the lighting for the triangles.

11. The method recited in claim 10, wherein the step of dividing is comprised of:

selecting a triangle edge having a largest number of vertices;

projecting triangle division lines from the selected edge to a vertex opposite that edge; and further partitioning regions defined by the partitioning in relation to a number of vertices ascribed to a second side of the triangle.

* * * * *